June 3, 1952  W. G. PATRIQUIN  2,599,477
SHOCK ABSORBER
Filed March 17, 1950
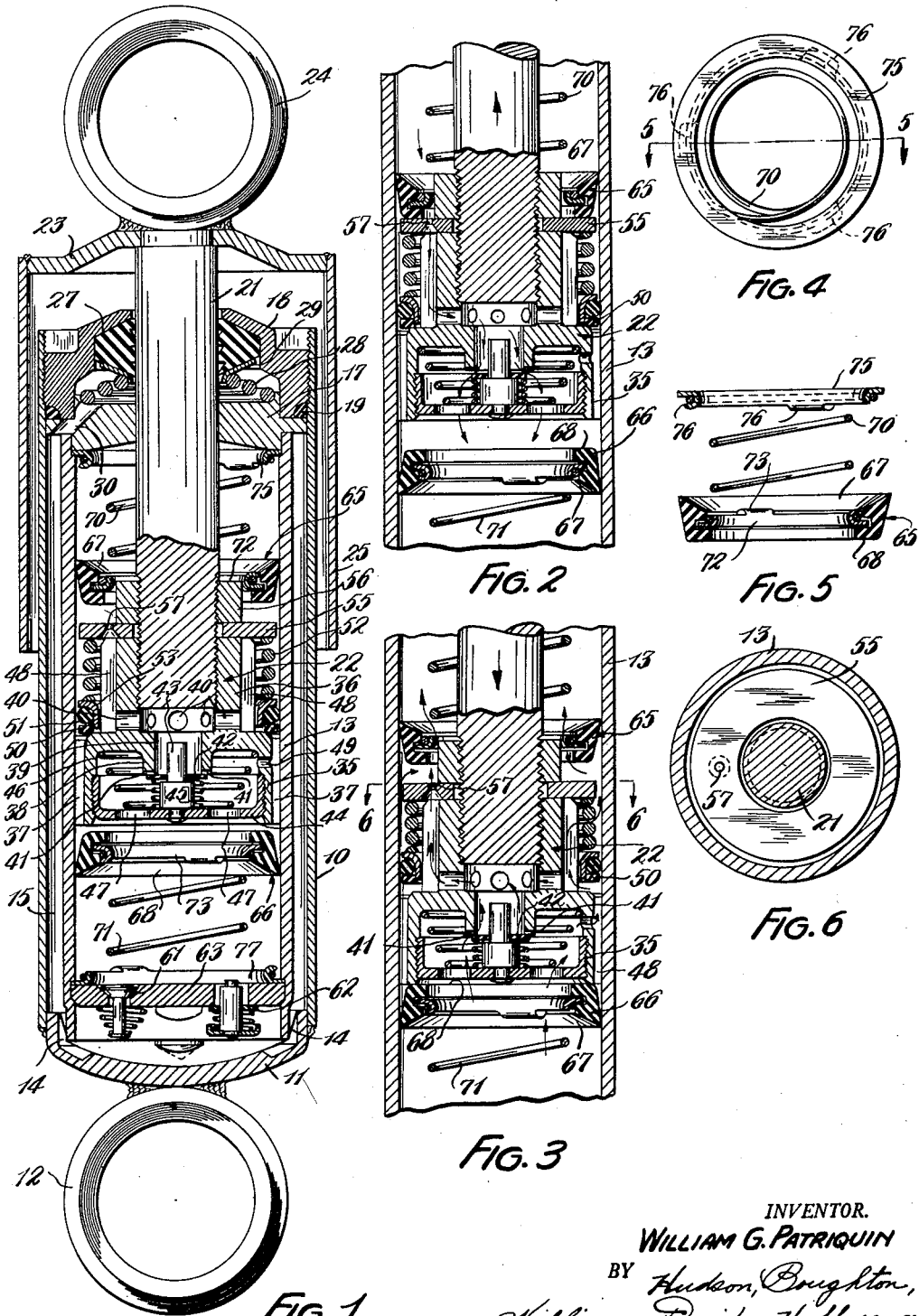
INVENTOR.
WILLIAM G. PATRIQUIN
BY Hudson, Boughton,
Williams, David & Hoffmann
ATTORNEYS Patented June 3, 1952

2,599,477

UNITED STATES PATENT OFFICE 2,599,477

SHOCK ABSORBER

William G. Patriquin, Cleveland, Ohio, assignor to The Gabriel Company, Cleveland, Ohio, a corporation of Ohio Application March 17, 1950, Serial No. 150,171

3 Claims. (Cl. 188—88)

The present invention relates to a shock absorber and particularly to an hydraulic type shock absorber.

Shock absorbers are generally provided on automotive vehicles to dampen the spring action and, occasionally such severe road shocks may be encountered that the axles would strike the frame in spite of the shock absorbers. To prevent damage to the vehicle in such cases it is usual to provide cushion blocks between the axles and frames to absorb the abnormally severe shocks. The present invention is directed to a shock absorber which provides spring snubbing action for normal road shocks and a stop or cushion blocking effect for the unusually severe shocks so that the usual axle cushion blocks may be omitted or eliminated.

An object of the present invention is to provide a new and improved hydraulic shock absorber of the type having a cylinder and piston reciprocable therein with relatively restricted fluid passage from one side to the other of the piston and which has valve means operative to substantially block the passage of fluid from one side of the piston to the other when the stroke of the piston relative to the cylinder exceeds the normal amplitude, thereby trapping fluid in the cylinder to provide a stop or cushion by which the shock absorber prevents the axle and frame from striking one another.

Another object of the invention is to provide a shock absorber of the type referred to having a new and improved valve operative to create an hydraulic stop in the shock absorber cylinder to limit the piston stroke relative to the cylinder, which valve comprises an annular resilient member adapted to form a seal between the cylinder walls and a piston surface when the piston stroke exceeds a predetermined amplitude.

A further object of the invention is to provide a valve operative to form a seal between the cylinder walls and piston of a shock absorber after a predetermined stroke of the piston and cylinder, and which valve is so constructed that hydraulic pressure to which the valve is subjected is effective to increase the sealing effect of the valve.

Other objects and advantages of the invention will be apparent from the following detailed description of a preferred embodiment of the invention, reference being had to the accompanying drawings, wherein:

Fig. 1 is a longitudinal sectional view of a direct double acting hydraulic shock absorber embodying the invention showing the parts in an inactive or neutral condition;

Fig. 2 is a fragmentary sectional view of the shock absorber showing the relative positions of the several parts when the shock absorber is at one extremity of its recoil stroke;

Fig. 3 is a view similar to Fig. 2 but showing the relative position of the parts when the shock absorber is at the extremity of the impact stroke;

Fig. 4 is an end view of a valve assembly;

Fig. 5 is a sectional view taken on line 5—5 of Fig. 4; and

Fig. 6 is a sectional view taken substantially along line 6—6 of Fig. 3.

In general, the invention, in its preferred form, contemplates the provision of a direct double acting tubular hydraulic shock absorber of the type having a piston reciprocable in a cylinder containing a fluid, such as a suitable oil, and which fluid passes through valved passages from one side of the piston to the other as the piston and cylinder are reciprocated relative to one another so that the fluid serves to resist rapid movement between the piston and cylinder. Valve means are located in the cylinder to engage with the piston for closing, or substantially closing, the fluid passages when the piston and cylinder exceeds a normal stroke thereby trapping fluid in the cylinder to form an hydraulic stop which positively limits the shock absorber strokes. The fluid passages include portions of the piston between the piston sides and the cylinder walls and the valve means preferably comprises an annular resilient member which is floatingly supported in the cylinder and which functions similarly to a packing gland between the cylinder walls and piston face engaged by the piston.

Referring to the drawings, I have shown a direct double acting tubular telescopic hydraulic shock absorber comprising a cylinder structure including a tubular casing 10 having a cap 11 suitably attached thereto, as by welding, and which cap has an eye formation 12 by which the cylinder can be attached to the axle of a vehicle. A cylinder 13 is concentrically disposed within the casing 10 and one end is located against the cap 11, which cap has grooves 14 to provide fluid passage between the cylinder interior and the space between the cylinder and casing, which space forms a fluid reservoir 15. The upper end of the cylinder 13 is closed by an end plate 17 which is held in place by a closure plate 18 threaded into the upper end of the casing 10. Preferably, a suitable sealing gasket 19 is interposed between the plates 17, 18 at the peripheries thereof to seal the end of the casing.

A piston rod 21 having a piston 22 attached thereto extends into the cylinder 13 and the outer end of the piston rod is attached to a cap 23 having an eye 24 integral therewith by which the piston rod can be secured to the frame of a vehicle. A sleeve 25 is attached to the cap 23 and surrounds the upper portion of the casing 10 to shield the upper end of the absorber from mud and grit. The piston rod extends through openings in the plates 17, 18 and a packing gland 27 is provided between the rod and plate 18 and preferably comprises a resilient annular member formed of a suitable material, such as synthetic rubber, and is held in place by a coil spring resting on plate 17 and engaging a washer 29 on the lower side of the washer. A drain passage 30 is provided between the space between plates 17, 18 and the reservoir 15 to permit oil wiped from the rod by the gland 27 to return to the reservoir.

The piston 22 has an inverted cup shaped section 35 and a tubular portion 36 of reduced diameter which is threaded onto the lower end of the rod 21. The piston section 35 slidingly engages the cylinder wall, and longitudinally extending grooves 37 are formed in the outer walls thereof which cooperate with the cylinder walls to provide fluid passages. A central, hollow boss 38 is formed in the section 35 and has a passage 39 which communicates with radially extending passages 40 formed through the walls of the portion 36 of the piston. The lower end of the boss 38 has two notches 41 formed therein and the passage 39 through the boss is adapted to be closed by a disc valve 42 which is slidingly located on a stud 43 attached to a cap 44 threaded into the lower open end of the piston. The valve plate 42 is urged against boss 38 by a coil spring 45 interposed between the valve and the cap 44 and the pressure of spring 45 on the valve is adjustable by rotating cap 44 one direction or the other. The cap 44 is retained at its setting by a lock spring 46 which maintains friction between the threads of the piston and cap. The grooves 41 form bleed passages about the valve 42 when the latter is in its closed position. The cap 44 has four openings 47, only two of which appear in the drawing, to provide a relatively free fluid passage.

The exterior of the piston section 36 has a plurality of longitudinally extending grooves 48, which provide relatively free fluid passages connected with the radial passages 40. A bleed opening 49 is provided through the wall of piston section 35 and leads into one of the grooves 37.

A one-way valve is provided about the upper edge of the piston section 35 for closing the upper ends of fluid passage grooves 37 to the down flow of fluid and permitting fluid passage upwardly under pressure. The valve comprises a fibre washer 50 and a suitable resilient ring 51 which is pressed against the walls of cylinder 13 and the washer 50 by a compression spring 52 which acts against an annular carrier 53 engaging the ring 51 and slidable along the piston. The upper end of the spring 52 rests against plate 55 secured integral with the piston by a nut 56 threaded on the rod 21. The outer edges of the plate 55 are spaced slightly from the walls of the cylinder 13 to provide a relatively free fluid passage there-around. Preferably, a single small opening 57 is formed through the plate 55 to provide a bleed passage.

During a relatively light impact stroke of the shock absorber, i. e., when the frame and axle move toward one another, the lower end of the cylinder and the piston move toward one another and fluid moves upwardly through the bleed passages 41, passages 39, 40, 48 and around the edges of plate 55. A heavier or more sudden impact causes the fluid pressure in the lower portion of the cylinder to unseat valve 50 and permit fluid to flow upwardly through passages 37 in a greater volume. On a more or less gentle rebound or recoil stroke i. e., when the frame and axle move from one another, causing the piston and upper end of the cylinder to move toward one another, fluid in the upper end of the cylinder passes downwardly from one side of the piston to the other by passing around the edges of plate 55, through passages 48, 40, 39 and bleed grooves 41 and through openings 47 and into the lower end of the cylinder. On a more sudden recoil, fluid then passes in greater volume through the openings 47 into the lower portion of the cylinder. The normal impact and recoil strokes may be several inches in length.

The fluid in the shock absorber passes to and from the reservoir 15 through one-way valves 61, 62 which are mounted in a valve disc 63 in the lower end of the cylinder 13. The valve 61 is closed during the impact strokes and open during the recoil stroke, and valve 62 opens during the impact stroke and is closed during the recoil stroke.

All of the details of the structure thus far described do not necessarily form an essential part of the present invention and shock absorbers similar to that described have been utilized heretofore. As brought out previously, in the past when using hydraulic shock absorbers it has been necessary or advisable to provide cushion blocks between the axles and frames of the vehicles to prevent damage to the vehicle when the impact stroke exceeded the normal stroke. The present invention provides a shock absorber which eliminates the necessity of the usual cushion blocks and it may also provide a positive stop for limiting the recoil stroke.

In accordance with the present invention, valve members 65, 66 are provided which float or are yieldingly supported on opposite sides of the piston 22 which serve to block the normal fluid passages from one side to the other of the piston when the impact or recoil strokes exceed their normal travel during relatively heavy impact and recoil strokes. The valves 65, 66 are alike and are each preferably formed of a resilient, synthetic rubber ring having the general outline of a truncated cone. The end surface 67 at the larger end is tapered inwardly and the other end surface 68 lies normal to the ring axis. The maximum diameter of the ring valves 65, 66 is slightly greater than the inside diameter of the cylinder 13 so that when the valves are positioned in the cylinder concentrically therewith, the valve edges resiliently engage the cylinder walls and the sides of the valves adjacent to the cylinder walls slope inwardly, as seen in the drawings.

The valves 65, 66 are each supported in the cylinder by coil springs 70, 71, respectively, which springs are attached to the valves by annular plates 72, having their edges projecting into grooves formed in the internal faces of the valve members and having lugs 73 turned over the spring ends. The upper end of spring 70 is attached to a washer 75 by lugs 76 integral with the washer and the washer is interposed between the plate 17 and a shoulder formed on the interior of cylinder 13 so that the valve ring is resiliently supported above the piston and is engaged by the piston only when the recoil stroke exceeds its normal travel. The spring 71 is likewise attached to an annular member 77 interposed between an internal shoulder of the cylinder 13 and the plate 63. The valve 66 is positioned by spring 71 so that it is engaged by the piston only when the impact stroke of the shock absorber exceeds its normal travel. The drawings do not necessarily indicate the true respective positions of valves 65, 66 and the piston, and in actual practice the valves may be spaced a greater distance from the piston than indicated by the drawings.

The inwardly sloping surfaces 67 of the valves 65, 66 cause the valve surfaces engaging the cylinder walls to be pressed more firmly against the walls as the pressure of the fluid trapped by the respective valves increases. By the construction disclosed, the valves 65, 66 and their supporting springs may be inexpensively fabricated and assembled in the shock absorber, and provide long lasting and dependable, efficient service.

It will be seen that when the normal impact stroke is exceeded, the piston member 35 engages valve member 66 which closes the lower ends of the fluid passages 37 between the member 35 proper and the cylinder walls, as may be clearly seen in Fig. 3. This action closes the path of fluid through the piston valve 50 to the upper side of the piston and the only alternative path is through the relatively minute bleed passages 41. Consequently fluid trapped in the lower portion of the cylinder and in the fluid reservoir 15, forms an hydraulic block preventing any substantial further relative movement between the piston and cylinder after the normal impact stroke has been exceeded.

Similarly, when the recoil stroke is exceeded, plate 55 engages the surface 68 of valve member 65 and the flow of fluid between the periphery of the plate 55 and the walls of cylinder 13 is blocked, as may be clearly seen in Fig. 2, and the only fluid passage is then through the relatively minute bleed opening 57. Consequently, the fluid trapped in the upper part of the cylinder forms a hydraulic lock which substantially blocks further relative movement between the piston and cylinder on the recoil stroke.

In both instances when the piston engages the valves 65, 66, the valves may yield relative to the cylinder, and it will be apparent that the amplitudes of the normal impact and recoil strokes are determined by the lengths of the valve supporting springs 70, 71.

It will be seen that by my invention a new and improved shock absorber has been provided having hydraulic stops for substantially limiting both the impact and recoil strokes of the shock absorber so that additional stop devices or cushions are unnecessary. The construction of the shock absorber is such that the hydraulic stop feature is provided by easily assembled valve structures which are inexpensive, accurate and dependable in operation.

Although I have described but one form of the invention, it is to be understood that other forms could be adopted all falling within the scope of the claims which follow.

Having thus described my invention, I claim:

1. In a fluid shock absorber having a cylinder and a piston in the cylinder, said piston and cylinder having relative reciprocation during impact and recoil strokes, said piston having an opening along the side thereof cooperating with the cylinder walls to provide a fluid passage through which fluid passes during said relative reciprocation, and an annular valve member supported in said cylinder in sealing engagement with the cylinder walls and engageable by said piston after a predetermined degree of relative movement between said piston and cylinder during one of said strokes for closing said passage, said valve member having the surface thereof facing the adjacent end of said cylinder tapered inwardly toward the axis of said valve and from said cylinder end.

2. In a fluid shock absorber having a cylinder and a piston in the cylinder, said piston and cylinder having relative reciprocation during impact and recoil strokes, said piston having an opening along the side thereof cooperating with the cylinder walls to provide a fluid passage through which fluid passes during said relative reciprocation, and an annular valve member supported in said cylinder in sealing engagement with the cylinder walls and engageable by said piston after a predetermined degree of relative movement between said piston and cylinder during one of said strokes for closing said passage, said valve member having the surface thereof facing the adjacent end of said cylinder tapered inwardly toward the axis of said valve and from said cylinder end, and having the sides thereof adjacent to the cylinder walls sloping inwardly and toward said piston.

3. In a fluid shock absorber having a cylinder and a piston in the cylinder, said piston and cylinder having relative reciprocation during impact and recoil strokes, said piston having an opening adjacent to the periphery thereof providing a fluid passage through which fluid passes during the said relative reciprocation, and a resilient annular valve member supported in said cylinder, said member having an annular surface engageable by said piston after a predetermined degree of relative movement of the said piston and cylinder during one of said strokes to close said passage and having circular side walls extending from said annular face and resiliently engaged in fluid sealing engagement with the walls of said cylinder.

WILLIAM G. PATRIQUIN.

REFERENCES CITED

The following references are of record in the file of this patent:

UNITED STATES PATENTS

| Number | Name | Date |
| --- | --- | --- |
| 1,444,248 | Hofmann | Feb. 6, 1923 |
| 1,744,514 | Thompson | Jan. 21, 1930 |
| 2,206,110 | Myers et al. | July 2, 1940 |
| 2,369,007 | Beecher | Feb. 6, 1945 |
| 2,379,750 | Rossman | July 3, 1945 |